United States Patent [19]

Barton et al.

[11] Patent Number: 4,678,042

[45] Date of Patent: Jul. 7, 1987

[54] METHOD AND APPARATUS FOR CUTTING AN ATHLETIC FIELD LINE

[75] Inventors: James W. Barton; Hubert D. Allen, both of Rockwall, Tex.

[73] Assignee: Tamer Corporation, Rockwall, Tex.

[21] Appl. No.: 780,982

[22] Filed: Sep. 27, 1985

[51] Int. Cl.⁴ .............................................. A01B 45/04
[52] U.S. Cl. ....................................... 172/15; 172/42; 56/17.1; 37/94
[58] Field of Search ........................ 172/21, 22, 42, 15, 172/16, 43; 273/55 R; 56/17.1, 17.2; 37/94

[56] References Cited

U.S. PATENT DOCUMENTS

| | | | |
|---|---|---|---|
| 1,600,663 | 9/1926 | Barrowman | 172/21 |
| 2,034,505 | 3/1936 | Cline | 172/21 |
| 2,520,488 | 8/1950 | Batchelder | 172/21 |
| 2,630,747 | 3/1953 | Mintz | 172/16 |
| 2,645,987 | 7/1953 | Brooks | 172/42 |
| 2,679,794 | 6/1954 | Ober | 172/42 |
| 2,690,636 | 10/1954 | Besse et al. | 59/256 |
| 2,703,959 | 3/1955 | Pool | 56/317 |
| 2,767,541 | 10/1956 | Yacby | 172/42 X |
| 2,882,977 | 4/1959 | Smith et al. | 172/15 |
| 2,979,837 | 4/1961 | Hunter | 37/94 |
| 3,102,376 | 9/1963 | Henderson | 172/15 |
| 3,693,334 | 9/1972 | Lowery | 56/256 |
| 3,734,196 | 5/1973 | Mangum | 172/16 |
| 3,852,944 | 12/1974 | Zuercher | 56/256 |

FOREIGN PATENT DOCUMENTS 1089843 11/1967 United Kingdom .................. 172/21

Primary Examiner—Richard J. Johnson
Attorney, Agent, or Firm—Jerry W. Mills; Jefferson Perkins

[57] ABSTRACT

An athletic field line cutter (10) has a chassis (12) including a plurality of wheels (98–104) for locomotion across the ground. A cutter head assembly (18) is mounted on the chassis (12) and includes a plurality of cutter blades (92) mounted on a rotating axle (30). Axle (30) is mounted parallel to the ground. An engine (14) is connected to axle (30) for supplying power to the axle (30) and the cutter blades (92). An operator station (60) at which an operator (90) directs the apparatus over the ground is in line with the cutter head assembly (18) and the line of travel of the apparatus (10). Rotating axle (30) has a section (126) which is polygonal in shape, and cutter blades (92) have central polygonal holes that closely fit over this polygonal shape. Blades (92) are angularly fixed with respect to each other.

14 Claims, 5 Drawing Figures

METHOD AND APPARATUS FOR CUTTING AN ATHLETIC FIELD LINE

TECHNICAL FIELD OF THE INVENTION

The present invention pertains to the preparation of athletic fields and more particularly to the cutting of athletic field lines on turf playing fields.

BACKGROUND OF THE INVENTION

Outdoor athletic playing fields, such as playing fields used for football, baseball, soccer or the like, require periodic application of boundary or market lines in order to define the limits of the playing field and subareas thereof. Such lines are usually made by applying white chalk or paint to a selected area.

It has been found that applying white chalk or paint to a strip of grass is relatively ineffective in that the white chalk will filter down through the grass and the white paint will soon be lost through repeated growth and cutting of the grass. It therefore becomes necessary to remove the grass and other foreign matter down to the surface of the earth before applying the chalk or paint line pigment.

Conventionally, this area has been somewhat inadequately prepared by edgers and the like. One conventional device has a plurality of rotating cutter blades that clear out a swatch of grass and, by moving the apparatus forward, clear out a strip or line so that paint or chalk may be deposited thereafter. The conventional device has however proved unsatisfactory for several reasons.

First, the conventional device employs a cutter head which is offset, in the usual manner for an edger or like device, from the line of sight of the operator. This makes it difficult for the operator to cut a straight line in the turf, as is usually necessary when marking athletic field lines. Even where the desired athletic field line is curved instead of straight, the path of an offset line cutter is still difficult to conform to the desired path, as the operator has only an imprecise idea as to whether his guiding efforts are successful.

Second, the rotary cutter blades of the conventional device have a tendency to slip from their desired positions so that the cutter blades are no longer angularly spaced apart from each other. When a series of elongate cutter blades slip until they are in alignment with each other, the result is an unsatisfactory removal of grass from the desired surface and an uneven, jerky movement of the device.

Third, the conventional device has no means of stopping the operation of the cutter blades while the engine is idling. Thus, with the conventional device, it is necessary to shut off the motor or other drive means in order to inspect or adjust the cutter head assembly.

In view of the above problems with the conventional device, there exists a need for a line cutting apparatus with which the operator may effectively cut a straight line or conform the progress of the apparatus to a predetermined curve. Further, there exists a need for a line cutting apparatus whose elongate blades will stay in one position and will remain in positions that are angularly spaced from each other on the cutter head axle. Finally, there exists a need for a line cutting apparatus that provides means to stop the operation of the cutter blades while its source of power is still idling.

SUMMARY OF THE INVENTION

The present invention comprises an athletic field line cutting apparatus having a chassis, a gasoline engine or other source of rotary power mounted on the chassis, and a cutter head assembly hinged to the front of the chassis. In a preferred embodiment, the chassis has four wheels, and the cutter head assembly is hinged to the front of the chassis in between the front wheels. An operator station is located directly to the rear of the chassis, such that the operator's line of sight is substantially colinear with the desired line of travel of the line cutting apparatus and the cutter head. In this way, the operator may easily cut a straight or precisely curved athletic field line.

The cutter head of the apparatus is provided with a polygonal shaft or axle on which are strung a plurality of elongate cutter head blades that have like polygonal holes through their centers. Because the polygonal center holes of the blades coact with the polygonal blade shaft to angularly lock the blades into position, the blades cannot slip out of their desired, angularly separated positions on the cutter head axle. Preferably, the cutter blade axle is hexagonal, and the blades are positioned 60 degrees from each other.

The cutter blade axle is rotated by means of a system of belts and pulleys extending back to a rotary power source such as a gasoline engine. A drive pulley is mounted coaxially with the drive shaft of the engine and communicates with the drive shaft by means of a centrifugal clutch. When the engine is idling below a certain rotary speed, the centrifugal clutch does not transmit rotational force to the pulley, and thus the pulley does not transmit force to the cutter blades. It is therefore possible to throttle the engine back to idle and inspect or adjust the cutter head or its blades. When the engine exceeds a certain rotational speed, the centrifugal clutch engages the drive shaft and the drive pulley so that force is transmitted to the cutter blades through the pulley and belt system.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
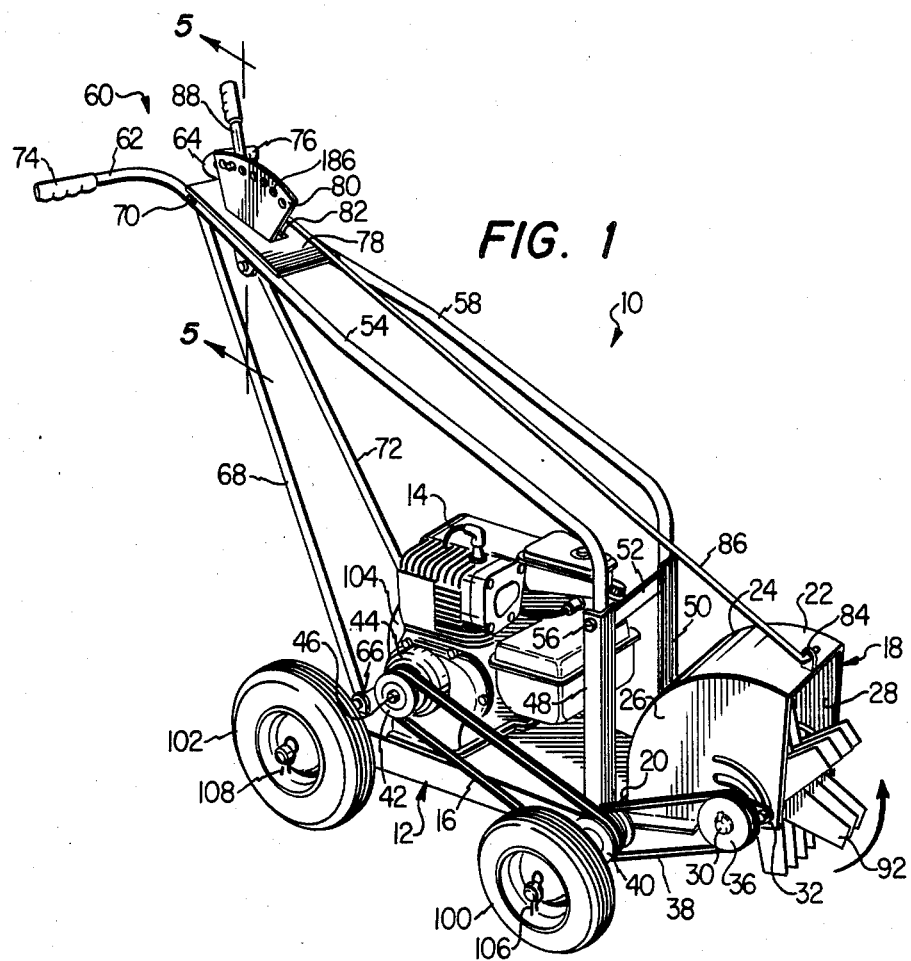
FIG. 1 is a perspective view of a preferred embodiment of the line cutting apparatus of the invention.

Referring to FIG. 1, a preferred embodiment of an athletic field line cutting apparatus 10 is shown. Apparatus 10 has a chassis 12 that can conveniently be formed of 3/16" steel plate. A rotary power source 14, such as a Briggs & Stratton 5HP four-cycle gasoline engine, is mounted on chassis 12 as by means of machine bolts (not shown). Preferably, the machine bolts are fed through front-to-rear slots (not shown) in chassis 12 in order to provide appropriate tension on a drive belt 16 by sliding engine 14 frontward of rearward to get the correct tension.

A cutter head assembly 18 is attached to the front of chassis 12, and is preferably hinged via a hinge 20 (better shown in FIG. 2) to chassis 12. Cutter head assembly 18 includes a hood 22 that protects the operator and bystanders from cut grass and other flying objects when the apparatus is operating. Hood 22 has an arcuate top wall 24 that preferably extends from hinge 20 forwardly to a point beyond the vertical. In a preferred embodiment, top wall 24 extends through 120°. A right side wall 26 and a left side wall 28 are attached as by welding to top wall 24.

Figure 2:
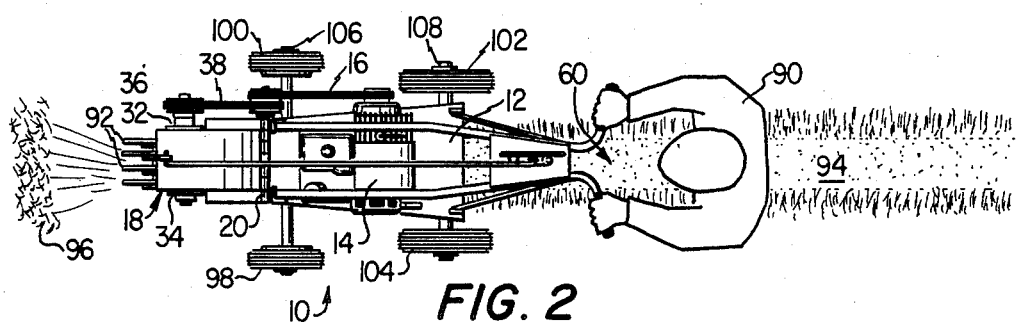
FIG. 2 is a plan view of the line cutting apparatus of the invention in operation, showing the in-line relationship of the cutter head, the desired line of travel and the line of sight of the operator.

A cutter head axle or shaft 30 extends through right side wall 26 and left side wall 28 and is supported on a pair of flange bearings 32 and 34 (FIG. 2). A cutter head pulley 36 is mounted on a cutter head axle 30. A cutter head belt 38 extends from cutter head pulley 36 to a double idler pulley 40. Drive belt 16 connects doubler idler pulley 40 with a drive pulley 42. Drive pulley 42 is, in the illustrated embodiment, built into a centrifugal clutch 44.

Centrifugal clutch 44 is mounted on a drive shaft 46 of engine 14. Centrifugal clutch 44 is a standard item available from several sources, the one illustrated being available from Max Torque Co. Centrifugal clutch 44 operates to engage drive shaft 46 and turn only if drive shaft 46 exceeds a certain rotational speed. Underneath this predetermined rotational speed, centrifugal clutch 44 is in free rolling engagement with drive shaft 46, and does not transmit power to drive belt 16 and the rest of the belt and pulley system. Centrifugal clutch 44 makes it possible to idle the engine and inspect cutter head assembly 18 without danger of injury. Clutch 44 also enables the tension of drive belt 16 and cutter head belt 38 to be set once in one operation, and not to have to be continually reset every time it is desired to functionally disengage engine 14 from cutter head 18. Since the provision of centrifugal clutch 44 allows belts 16 and 38 to remain tight at all times, a belt guard is unnecessary.

Figure 4:
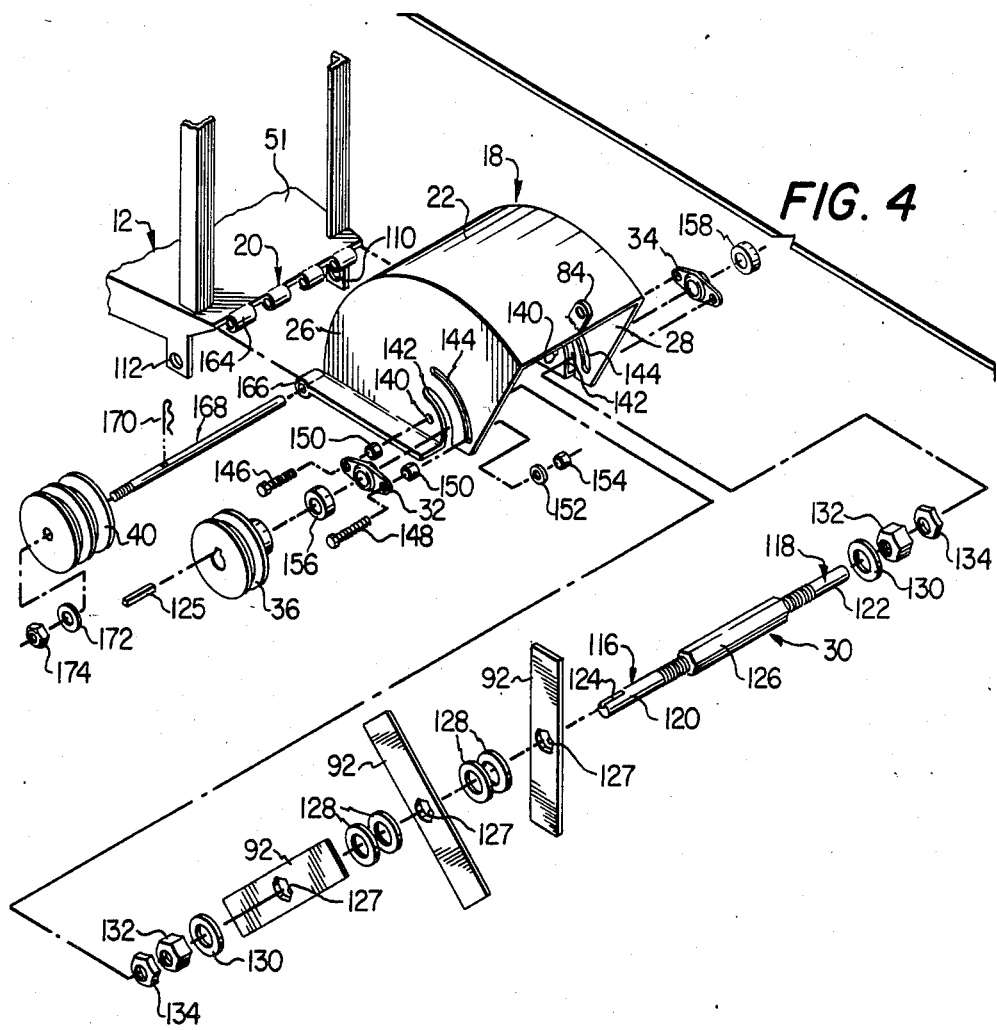
FIG. 4 is an exploded perspective view of the cutter head assembly shown in FIG. 3, together with the front of the chassis of the apparatus.

Chassis 12 has a pair of upstanding angle irons 48 and 50, or other strong structural supports, attached as by welding to its front end 51 (FIG. 4). Angle irons 48 and 50 can conveniently be fabricated or 3/16" steel plate. A bar 52 may be attached as by welding in between angle irons 48 and 50 for further support.

A right upper tubing section 54 is attached as by a bolt 56 and nut (not shown) to right angle iron 48. Similarly, a left upper tubing section 58 is attached as by a bolt and nut (not shown) to left angle iron 50. It is preferred that tubing sections 54 and 58 be removable to more easily gain access to engine 14. Right and left upper tubing sections 54 and 58 extend upwardly and rearwardly from angle irons 48 and 50 to an operator's station 60, where they flair outwardly to become handle bars 62 and 64.

An upright flange 66 is welded to the rear of chassis 12 and is drilled to provide a point of attachment for a right tubular brace 68. Right tubular brace 68 extends from flange 66 upwardly to be joined with right upper tubing section 54 as by a bolt 70 and a nut and washer (not shown). A left tubular brace 72 is attached to chassis 12 by means of a left rear flange member similar to upright flange 66, and extends upwardly to be bolted to left upper tubing section 58. Handle bars 62 and 64 may be provided with suitable rubber grips 74 and 76. Tubular sections 54, 58, 68 and 72 can conveniently be fashioned of $\frac{7}{8}$" o.d. 0.109" thick tubing.

The operator of the apparatus in this embodiment provides the motion of the apparatus over the ground by pushing it. In another embodiment, apparatus 10 could be self-powered, as per some conventional lawn mowers, so that the operator would merely have to guide rather than push the apparatus.

A flange 84 is welded or otherwise attached to arcuate top wall 24, and is drilled to provide a hole for the insertion of an adjustment bar or link 86. Adjustment bar 86 cooperates with an adjustment handle 88 and a vertical plate 80 in a manner later described in order to adjust the height of cutter head assembly 18 in relation to the ground. The lower end of adjustment bar 86 is pivotally secured to flange 84 as by means of a cotter pin (not shown) inserted into a bore in the end.

Referring to FIG. 2, a plan view is shown of line cutting apparatus 10 in operation. An operator 90 is positioned at operator's station 60 and is pushing cutting apparatus 10 forward. Cutter head assembly 18 includes a plurality of cutter blades 92 whose arrangement and method of affixation to cutter head axle 30 (FIG. 1) will be later described. Blades 92 cooperate to catch and tear the grass to clear a preferably four-inch strip of earth down to ground level, as shown at 94. Torn grass and other surface matter are thrown ahead of the apparatus as shown at 96 in order to best protect operator 90 as well as leave a clean strip of earth 94 behind cutting apparatus 10.

Operator 90's line of sight is directly in line with strip 94 and cutter head 18. This represents a distinct advantage over the prior art, where the equivalent of cutter head 18 was offset from the line of travel of apparatus 10. A principal advantage of the invention is that, by having the operator's line of sight be directly in line with line of work, operator 90 may easily and substantially conform the forward progress of apparatus 10 to a predetermined straight or curved line.

Chassis 12 preferably has four wheels 98, 100, 102 and 104 that are preferably mounted to the corners of chassis 12. Wheels 98-104 are of the type found on lawn mowers and the like and have internal bearings which rotate around wheel axles 106 and 108 respectively (best shown in FIG. 1). Wheels 98-104 are preferably sized from eight inches to ten inches in diameter and are equipped with rubber tires.

In a preferred embodiment, each wheel axle is received within left and right corner bracket which are welded to and depend from chassis 12. A pair of brackets 110 and 112 for front axle 106 are shown in FIG. 4. Similar brackets are provided for rear axle 108. Alternatively, a straight axle extending all the way across the width of chassis 12 may be eliminated, and short axle segments for each independent wheel may be substituted in their place. Complete axles 106 and 108 are however preferred in that they ensure that wheels 98-104 are more exactly parallel than if wheels 98-104 are independently mounted. This in turn makes sure than apparatus 10 will travel in a straight line with a minimum of correction where a straight line is being cut.

It is preferred that front wheels 98 and 100 be spaced well to the side of cutter head 18 rather than underneath or behind it. Cutter head 18 causes considerable vibration and may buck undesirably when it encounters an unusual obstruction. The disposition of front wheels 98 and 100 shown in FIG. 2 gives cutter head 18 and apparatus 10 to a greater stability.

Figure 3:
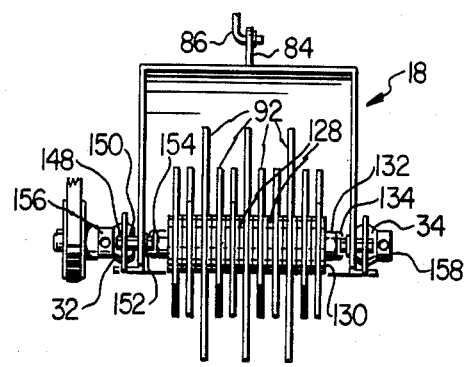
FIG. 3 is an elevational view of a cutter head assembly according to the invention, showing the positioning of the cutter blades on a hexagonal cutter axle and other components associated therewith.

FIGS. 3 and 4 are detail view of cutter head assembly 18 and adjacent components of apparatus 10. Cutter head shaft or axle 30 is formed of polygonal bar stock, and is preferably fabricated from a ⅜ inch dia. regular hexagonal steel bar. A right end 116 and a left end 118 of axle 30 are turned and threaded, with the extreme portions 120 and 122 thereof being smooth for rolling engagement with flange bearings 32 and 34. The turned portion of right end 116 is made longer than the turned portion of left end 118 and provided with a way 124 for a square key 125. A portion 126 of axle 114 that is left polygonal in cross section is preferably sized to be a little less than six inches in length in order to cut a four-inch wide strip for an athletic field line.

A plurality of the blades 92 are strung onto hexagonal axle 114 to occupy polygonal portion 126. Each blade 92 is preferably ten inches long and made of steel, and is punched in its center 127 with a polygonal shape that closely fits over the polygonal cross-section of portion 126. In a preferred embodiment, the polygonal shape is a regular hexagon and matches a regular hexagonal cross-section of section 126. In the illustrated embodiment, eleven blades 92 are strung onto portion 126 and are each spaced apart by a pair of fiberglass washers 128 from adjacent blades 92. The axial spacing of blades 92 in the illustrated embodiment exceeds the thickness of any blade 92. Each blade 92 is angularly separated from an adjacent blade 92 by 60° in order to angularly distribute blades 92 evenly around axle 30 and provide an even cut. The close fit of hexagonal centers 127 to hexagonal axle portion 126 locks the blades in place and prevents the blades from undesirably rotating away from their desired angular positions. This solves the tendency of blades in conventional devices to rotate or slip until they are in line with each other.

Only three blades 92 are shown in FIG. 4 for the sake of clarity. As shown in FIG. 3, eleven blades 92 are provided in all. This number of blades, and the illustrated length of section 126, may be increased or decreased according to the desired width of the cut strip of grass. As assembled, blades 92 and washers 128 are bounded on axle 114 by steel washers 130, nuts 132 and lock nuts 134.

Smooth portions 120 and 122 of axle 30 rest respectively within a flange bearing 32 and 34. Flange bearings 32 and 34 can be of any known conventional make, such as those available from VCA/Bauer Co. Flange bearings 32 and 34 contain ball or roller bearing races on which bearing surfaces 120 and 122 freely roll.

Right side wall 26 of hood 22 is provided with a bore 140, a central arcuate slot 142 and upper arcuate slot 144. Left side wall 28 has a corresponding bore 140, central arcuate slot 142 and upper arcuate slot 144. Flange bearing 32 is mounted to right side wall 26 by means of bolts 146 and 148, spacer nuts 150, washers 152 and end nuts 154. Bolt 146 is received into bore 140, and bolt 148 is received into arcuate slot 144. Axle 30 is received into central arcuate slot 142. Spacer nuts 150 separate flange 32 from right side wall 26. Bolts 146 and 148 are secured on the other side of right side wall 26 by washers 152 and nuts 154 (only for bolt 148 shown). Left flange bearing 34 is mounted to left side wall 28 in a manner similar to right flange bearing 32.

Figure 5:
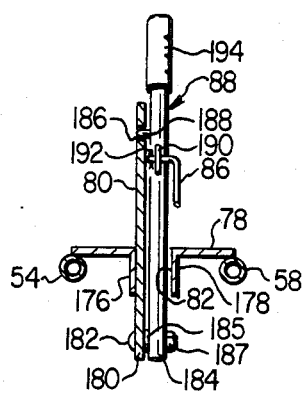
FIG. 5 is a sectional view taken substantially along line 5—5 of FIG. 1, showing a preferred embodiment of the cutter head adjustment handle and vertical plate.

In order to adjust the position of axle 30 in relation to hood 22, bolts 146 and 148 are loosened in order to allow movement of one end of flange bearing 32 in arcuate slot 144. Flange bearing 34 is similarly loosened. Once the flanges are repositioned along slots 144, the bolt and nut assemblies 146-154 are retightened in place. This provides a second means of adjustment of blades 92 to the ground level independent of adjustment bar 86 and handle 88 (FIGS. 1 and 5).

In order to secure axle 30 through and between flange bearings 32 and 34, lock collars 156 and 158 are affixed to portions 120 and 122 of axle 30 at positions to the exterior of flange bearings 32 and 34, as is best shown in FIG. 3. The cutter head pulley 36 is affixed to the end of axle portion 120 by means of square key 125 and key way 124.

Cutter head assembly 18 is attached to front end 51 of chassis 12 by means of hinge 20. Preferably, hinge 20 is parallel to and radially removed from axle 30, although it could be also be at right angles. It is also preferred that axle 30 and hinge 20 be perpendicular to the direction of travel of apparatus 10. A plurality of barrels 164 are affixed as by welding to front end 51, and a plurality of other barrels 166 are affixed as by welding to the rear of hood 22. Barrels 164 and 166 interleave and are pinned by a hinge pin 168.

Hinge pin 168 also acts as the axle of double idler pulley 40. Double idler pulley 40 may be fabricated from two single idle pulleys by removing the flange from one pulley, welding the two pulleys together where the flange is removed and replacing the pulleys' internal roller or ball bearing races with one cylindrical bearing race having a suitable axial dimension, such as 1⅜"×⅝" bearing. Once hinge pin 168 has pinned barrels 164 and 166 together, either a barrel 164 or a barrel 166, and hinge pin 168, are drilled through and a roll pin (not shown) is inserted in order to prevent hinge pin 168 from rotating. Pulley 40 rolls freely on hinge pin 168. The location of pulley 40 on hinge pin 168 is limited by a cotter pin 170 to the interior and a washer 172 and a nut 174 on the exterior. Hinge pin 168 is threaded in order to receive washer 172 and nut 174.

Doubler idler pulley 40 is made coaxial with hinge 20 in order to keep belts 38 and 16 completely tight. No matter what the angular relation of hood 22 is to chassis 12, the belts will remain tight because double idler pulley 40 is the point of articulation for both belts 38 and 16 and hood 22 and chassis 12. Were double idler pulley not coaxial with hinge 22, the tension on belts 16 and 38 would have to be readjusted with each readjustment of the height of hood 22 with respect to chassis 12.

Referring now to FIG. 5, an elevational section of the hood adjusting apparatus is shown. A horizontal plate 78 is preferably fabricated out of 3/16" thick steel plate and is welded in place between right upper tubing section 54 and left upper tubing section 58. A center slot 82 is created by cutting and downwardly folding a flange 176 and a flange 178. Flange 176 is used as a point of attachment for vertical plate 80. Preferably, horizontal plate 78 and vertical plate 80 are affixed to each other by welding.

Vertical plate 80 is shaped after the manner of a circular segment, as best shown in FIG. 1, and has a lower apex 180 that is bored for a rivet or bolt 182. A lower end 184 of handle 88 is likewise drilled in order to receive bolt 182 to provide an articulating joint between vertical plate 80 and handle 88. A washer 185 slightly spaces handle 88 away from plate 80, and a nut 187 secures handle 88 to bolt 182.

Vertical plate 80 is drilled with a series of adjustment detents or holes 186 toward its upper arcuate perimeter. Holes 186 are radially equidistant from bolt 182 and are preferably evenly spaced from each other. A peg 188 is affixed to the side of handle 88 and is designed to nest inside any of holes 186 in order to fix hood 22 in a particular position.

A tab 190 is mounted on the front of handle 88 at a point radially removed from bolt 182. Tab 190 is bored to receive the upper end of adjustment bar or link 86. Adjustment bar 86 is bent at its upper end and inserted through tab 190, and secured on the other side as by means of a cotter pin 192 or the like. Cotter in 192 is received into a bore drilled into the upper end of adjustment bar 86.

Handle 88 is sufficiently stiff that peg 188 will remain within hole 186 during operation of the apparatus, but is sufficiently springy to allow handle 88 to be moved sideways and the peg reinserted into another hole 186. Center slot 82 is dimensioned to allow peg 188 to clear hole 186 when handle 88 is forced sideways. In this way, hood 22 can be lowered or raised around hinge 20 with respect to chassis 12, and a new position fixed in place, from operator station 60. In operation, cutter head 18 is raised or lowered on hinge 20 until blades 92 skim the earth. Handle 88 may be conveniently provided with a rubber grip 194.

In summary, an improved athletic field line cutting apparatus has been disclosed. The apparatus provides a cutter head that is in line with the operator station, so that the operator's line of sight is in line with the line of travel of the apparatus. This enables the operator to cut a nearly perfect straight line or a nearly perfect predetermined curved line with a minimum of guiding effort and estimation. The invention also provides a hexagonal shaft or axle on which the cutter blades are mounted so that there is no angular slippage of one blade with respect to any other. A hinge between the chassis of the apparatus and the cutter head assembly allows the blade to be raised or lowered to a particular level, and the provision of a double idler pulley coaxial with the hinge and a centrifugal clutch allows the drive belts to remain tight at all times.

Although an illustrated embodiment of the invention has been described in detail, it should be understood that various changes, substitutions and alterations can be made therein without departing from the spirit and scope of the invention as defined by the appended claims.

What is claimed is:

1. Apparatus for cutting an athletic field line, comprising:
   a chassis including a front end and a rear end;
   a plurality of wheels including a pair of laterally spaced rear wheels for supporting said chassis in a fixed attitude relative to the ground and for locomotion across the ground in a predetermined line of travel;
   drive means mounted on said chassis;
   a cutter head mounted on the front end of said chassis by means of a hinge substantially parallel to the ground and substantially perpendicular to said predetermined line;
   an axle rotatably mounted on said cutter head and spaced forward of and disposed substantially parallel to said hinge;
   a plurality of cutter blades mounted on said axle to skim the earth for removing a continuous strip of grass and the like from a band of earth between said rear wheels, said strip being substantially narrower than the space between said rear wheels straddling said predetermined line to form an athletic field boundary line, said blades rotating so as to throw cut grass and the like forward of the apparatus;
   said drive means coupled to said rotating axle for supplying power to said axle and cutter blades;
   an operator station at said rear end at which an operator directs the apparatus over the ground on said predetermined line, said cutter head and said operator station substantially centered on and colinear with said predermined line; and
   means at said operator station and coupled to said cutter head for adjusting the level of said cutter head relative to the ground.

2. The apparatus of claim 1, wherein said means for adjusting comprises a link attached to said cutter head and extending to said operator station, said link having an attachment to an adjustment handle at said operating station, said handle including a length extending from said link attachment to a pivot vertically removed from said link attachment, a member fixedly mounted to said chassis receiving said pivot, the position of said handle being settable and resettable to any one of a plurality of positions in order to control the level of said cutter head with respect to said chassis through said link.

3. The apparatus of claim 2 wherein said operating station includes a support framework, a vertical adjustment plate secured to said framework, said adjustment handle pivot being secured to a lower end of said vertical adjustment plate, a plurality of holes being formed in said plate radially equidistant from said handle pivot, a peg affixed to said handle adaptable to be inserted into any one of said holes in order to secure said adjustment handle and said cutter head in a fixed position.

4. The apparatus of claim 1 wherein said chassis has four wheels disposed in parallel at corners of said chassis.

5. The apparatus of claim 1 wherein said cutter head is mounted between a pair of front wheels mounted on front corners of said chassis.

6. The apparatus of claim 1 wherein a cutter head pulley is mounted on said axle, a belt extending from said cutter head pulley to a double idler pulley, said hinge including a hinge pin, said double idler pulley rotatably mounted on said hinge pin, a belt extending from said double idler pulley to a drive pulley mounted coaxial to a drive shaft of said drive means.

7. The apparatus of claim 6, wherein said drive pulley is mounted on said drive shaft via a centrifugal clutch, said centrifugal clutch transmitting rotating force to said drive pulley from said drive shaft only when said drive shaft is exceeding a certain rotational speed.

8. The apparatus of claim 1, wherein:
   said axle includes a length having a polygonal cross-section;
   said plurality of cutter blades each having a polygonal central hole whose shape closely corresponds to the cross-section of said axle, said blades being mounted perpendicular to said axle length, said axle extending through said central holes to prevent undesirable rotation of said blades relative to said axle.

9. The apparatus of claim 8, wherein said polygonal shaft has a cross-section in the shape of a regular hexagon.

10. The apparatus of claim 9, wherein said cutter blades are elongate and are mounted on said rotating axle so as to be angularly spaced by 60 degrees from any adjacent cutter blade.

11. The apparatus of claim 8, wherein said cutter blades are fixably and axially spaced from each other on said axle by an amount of exceeding a blade's thickness.

12. Apparatus for cutting an athletic field boundary line, comprising:
a cutter head;
an axle rotatably mounted to said cutter head by means of right and left adjustable flange bearings supporting said axle near each end thereof;
a plurality of cutter blades fixedly mounted to said axle so as to be perpendicular thereto;
said cutter head comprising an arcuate hood extending over said cutter blades, a right wall and a left wall depending from said hood on either side of said cutter blades;
said right and left adjustable bearings each having two mounting bolts, a first right bearing mounting bolt being received in a bore in said right wall, a second right bearing mounting bolt being received in an arcuate slot in said right wall, an axle slot formed in said right wall in between said bore and said second right bearing arcuate slot, said left wall having a corresponding bore and arcuate slot for the mounting of said left bearing by corresponding bolts and a corresponding axle slot, the position of the axle with respect to said axle slots being adjustable by varying the position of said second bearing bolts within said arcuate slots; and
drive means coupled to said axle for supplying power to rotate said axle and said cutter blades.

13. A method for cutting an athletic field boundary line, comprising the steps of:
positioning an operator station behind a cutter head such that the operator's line of sight is in line with the line of travel and the cutter head;
providing a cutter head axle with a plurality of vertically oriented spaced apart cutter blades;
adjusting the cutter blade axle with respect to the cutter head by positioning a first axle bearing bolt within an arcuate slot formed in a right wall of the cutter head, a second axle bearing bolt being received within a bore in the right wall, the axle being received through an axle slot in the right wall located between the first bearing bolt arcuate slot and the bore;
likewise adjusting a second bearing located on a left wall of the cutter head;
hinging the cutter head to the chassis of the cutter apparatus, at an axis radially removed from the blade axle;
adjustably articulating the cutter head such that the locus of the cutter blade extremities skims the earth; and
moving the cutter apparatus in the line of travel to remove grass and the like from a predetermined strip of earth defining the boundary line, the operator checking the progress of the cutter head against his line of sight.

14. The method of claim 13 wherein drive means comprising a system of belts and pulleys is coupled to the cutter head axle, the method further including the steps of:
providing a centrifugal clutch on a drive shaft of the drive means;
idling a drive pulley when the drive shaft rotates below a predetermined speed; and
engaging and rotating the drive pulley by means of the centrifugal clutch when the drive shaft exceeds the predetermined speed.

* * * * *